United States Patent
Peng et al.

(10) Patent No.: US 8,868,468 B2
(45) Date of Patent: Oct. 21, 2014

(54) INTELLIGENT DECISION SUPPORTING SYSTEM AND METHOD FOR MAKING INTELLIGENT DECISIONS AND CLASSIFYING TEXT USING CLASSIFIERS TRAINED TO DEFINE DIFFERENT SEMANTIC STANDARDS

(75) Inventors: Ge Peng, Nanjing (CN); Ying Jiang, Nanjing (CN); Jin Wang, Nanjing (CN); Sipei Liu, Nanjing (CN)

(73) Assignees: Samsung Electronics Co., Ltd., Suwon-si (KR); Samsung Electronics (China) R&D Center, Nanjing (CN)

( * ) Notice: Subject to any disclaimer, the term of this patent is extended or adjusted under 35 U.S.C. 154(b) by 519 days.

(21) Appl. No.: 13/017,266

(22) Filed: Jan. 31, 2011

(65) Prior Publication Data

US 2011/0191270 A1  Aug. 4, 2011

(30) Foreign Application Priority Data

Feb. 2, 2010 (CN) .......................... 2010 1 0105287

(51) Int. Cl.
| | |
|---|---|
| G06F 15/18 | (2006.01) |
| G06F 19/24 | (2011.01) |
| G06F 17/21 | (2006.01) |
| G06F 17/30 | (2006.01) |
| G06N 5/04 | (2006.01) |

(52) U.S. Cl.
CPC ....................... *G06N 5/04* (2013.01)
USPC ................... 706/10; 706/20; 706/45; 706/46

(58) Field of Classification Search
USPC ........................................................ 706/10
See application file for complete search history.

(56) References Cited

U.S. PATENT DOCUMENTS

| 7,685,146 B2 | 3/2010 | Wu et al. |
| 2010/0094844 A1 | 4/2010 | Cras |

OTHER PUBLICATIONS

Bloehdorn et al., Boosting for Text Classification with Semantic Features [online], 2004 [retrieved on Dec. 1, 2012]. Retrieved from the Internet:<URL:http://www.google.com/search?q=Boosting+for+Text+Classification+with+Semantic+Features&sourceid=ie7&rls= com.microsoft:en-us:IE-SearchBox&ie=&oe=>.*

Heβet al., Iterative Ensemble Classification for Relational Data: A Case Study of Semantic Web Services [online], 2004 [retrieved on Nov. 16, 2013]. Retrieved from the Internet:<URL:http://citeseerx.ist.psu.edu/viewdoc/summary?doi=10.1.1.1.6824>.*

* cited by examiner

*Primary Examiner* — Jeffrey A Gaffin
*Assistant Examiner* — Nathan Brown, Jr.
(74) *Attorney, Agent, or Firm* — Jefferson IP Law, LLP

(57) ABSTRACT

An intelligent decision system and a method for making an intelligent decision are provided. The intelligent decision supporting system includes a multi-dimensional classifier comprising a plurality of classifiers that define different semantic standards and are trained based on the different semantic standards, for classifying a text by the semantic standards and for outputting a plurality of attributes of the text and a confidence rate of each of the plurality of attributes, a question submitting module for receiving the output of the multi-dimensional classifier, for forming a question based on the plurality of attributes of the text and the confidence rate of each attribute, and for submitting the question to an inference machine, the inference machine for receiving the question submitted by the question submitting module, for inquiring of a domain ontology knowledge library based on the question, and for providing an answer for the question to an decision reply module.

14 Claims, 3 Drawing Sheets

INTELLIGENT DECISION SUPPORTING SYSTEM AND METHOD FOR MAKING INTELLIGENT DECISIONS AND CLASSIFYING TEXT USING CLASSIFIERS TRAINED TO DEFINE DIFFERENT SEMANTIC STANDARDS

PRIORITY

This application claims the benefit under 35 U.S.C. §119 (a) of a Chinese patent application filed in the State Intellectual Property Office of the Peoples Republic of China on Feb. 2, 2010 and assigned Serial No. 201010105287.6, the entire disclosure of which is hereby incorporated by reference.

JOINT RESEARCH AGREEMENT

The presently claimed invention was made by or on behalf of the below listed parties to a joint research agreement. The joint research agreement was in effect on or before the date the claimed invention was made and the claimed invention was made as a result of activities undertaken within the scope of the joint research agreement. The parties to the joint research agreement are Samsung Electronics Co., LTD., and Samsung Electronics (China) R&D Center.

BACKGROUND OF THE INVENTION

1. Field of the Invention

The present invention relates to a technical field of intelligent decision. More particularly, the present invention relates to an intelligent decision supporting system and a method for making intelligent decision.

2. Description of the Related Art

With the development of technologies that provide information, such as the internet, the processing speed and volume of various types of information that are received and processed by people are rapidly increasing. When receiving information from different channels, for example, digital document information such as a webpage on the internet, an email, a digital library etc., people need to make judgments and decisions according to the information provided by these digital documents. It is an important subject in the field of digital document processing to classify text so as to efficiently and quickly process the digital document. Text classification refers to the construction of a model for classification based on the available data, i.e. a classifier. A classifier determines a category for each document in a set of test documents according to a predefined classification system, such that a user is able to conveniently browse a document, or to facilitate searching for documents by limiting the scope of searching Automatic text classification refers to training of a classification rule or modeling parameters by using a large amount of text with class tags, and recognize text of an unknown category by using the result of the training. Support Vector Machine (SVM) is a well-known method for text classification, and is widely used. SVM is a pattern recognition method based on statistics and learning theory, which shows special advantages in resolving problems of pattern recognition of small sample, non-linear and high dimensions, and can be applied to other machine learning problems such as function fitting. SVM is now successfully applied to many fields such as Bioinformatics, text and handwriting recognition etc.

A current text classifier is only used to classify text or insert a label to text for classification. More particularly, the text classifier first collects data according to predefined classification levels to form a large quantity of training samples. Then, the text classifier performs feature extraction and model training on the training samples to generate a model of text category. Next, the text classifier may classify text to be predicted by using the model obtained by training. In particular, the text classifier pre-processes the text to be predicted, extracts features of the text, and classifies the text by using the generated model. The text classifier outputs a confidence rate for each category, and classifies the text to be predicted into a plurality of categories according to the confidence rate, or adds a label to the text to be predicted and classifies it.

However, a problem exists in the related art in that the categories into which the text is classified by the text classifier are predefined tags, which cannot be used to make an intelligent decision. That is, it is unable to obtain a decision related to the text through text classification. Thus, an intelligent decision supporting system, which may predict an intention or interest of a client by text classification and other techniques of related art, and provide a feedback opinion or hint to help the user/client to make a decision is needed.

SUMMARY OF THE INVENTION

An aspect of the present invention is to address at least the above-mentioned problems and/or disadvantages and to provide at least the advantages described below. Accordingly, an aspect of the present invention is to provide a method for integrating a text classifier and a knowledge domain ontology to make an intelligent decision. Herein, "knowledge domain ontology" may refer to a knowledge database of a specific technical domain, including a data structure determined by experts in the art that can be searched. For example, in a knowledge domain ontology of geography, knowledge information corresponding to attribute information of "travel" and "Beijing" may be "tourist route of Forbidden City", "Guide of Great Wall", "Guide of Summer Palace" etc.

Another aspect of the present invention is to provide an intelligent decision supporting system that includes semantic description of the text. Here, a classification category corresponding to the text classifier of each dimension represents a set of semantic standards. By doing this, a confidence rate output from the classifier represents a confidence degree for a category under each semantic standard (including each semantic attribute of each standard). The confidence degree of all attributes is input into a question submitting system as input, semantic fusion may be applied to each semantic attribute of multiple categories to output an intelligent decision. This intelligent decision is not limited to predefined categories. Fusion of semantic deduction will give a more intelligent decision to satisfy the user's requirement. In order to achieve intelligent semantic fusion, each set of standards of a classifier of multi-dimensions is required not to overlap with each other, and corresponds to content of the knowledge domain ontology. That is, a category and attribute which are defined by each set of standards of text classifier of each dimension should be included within the scope of description of the knowledge domain ontology.

According to an aspect of present invention, an intelligent decision supporting system is provided. The system includes a multi-dimensional classifier, comprising a plurality of classifiers that define different semantic standards and are trained based on the different semantic standards, for classifying a text by the semantic standards and for outputting a plurality of attributes of the text and a confidence rate of each of the plurality of attributes of a text, a question submitting module for receiving the output of the multi-dimensional classifier, for forming a question based on the plurality of attributes of the text and the confidence rate of each attribute, and for submitting the question to an inference machine, the inference machine for receiving the question submitted by the question submitting module, for inquiring of a domain ontology knowledge library based on the question, and for providing an answer for the question to a decision reply module, a domain ontology knowledge library module for storing a domain ontology knowledge library related to an application domain of the intelligent decision supporting system, wherein the domain ontology knowledge library records descriptions of rules for deriving decisions corresponding to the semantic standards of the multi-dimensional classifier, and the decision reply module for providing the answer for the question provided by the inference machine to the user.

According to another aspect of present invention, a method for making an intelligent decision is provided. The method includes, defining semantic standards of a plurality of classifiers of a multi-dimensional classifier according to an application domain and recording descriptions of rules in a domain ontology knowledge library for deriving decisions that correspond to the semantic standards of the multi-dimensional classifier, collecting training texts according to the semantic standards, and training the multi-dimensional classifier, classifying a text to be analyzed by using multiple standards, and outputting attributes of the text and confidence rate of each attribute, forming a question for intelligent decision based on attributes of the text and the confidence rate of each attribute, and inquiring of the domain ontology knowledge library based on the question by an inference machine to obtain an answer for intelligent decision and providing the answer to a user.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
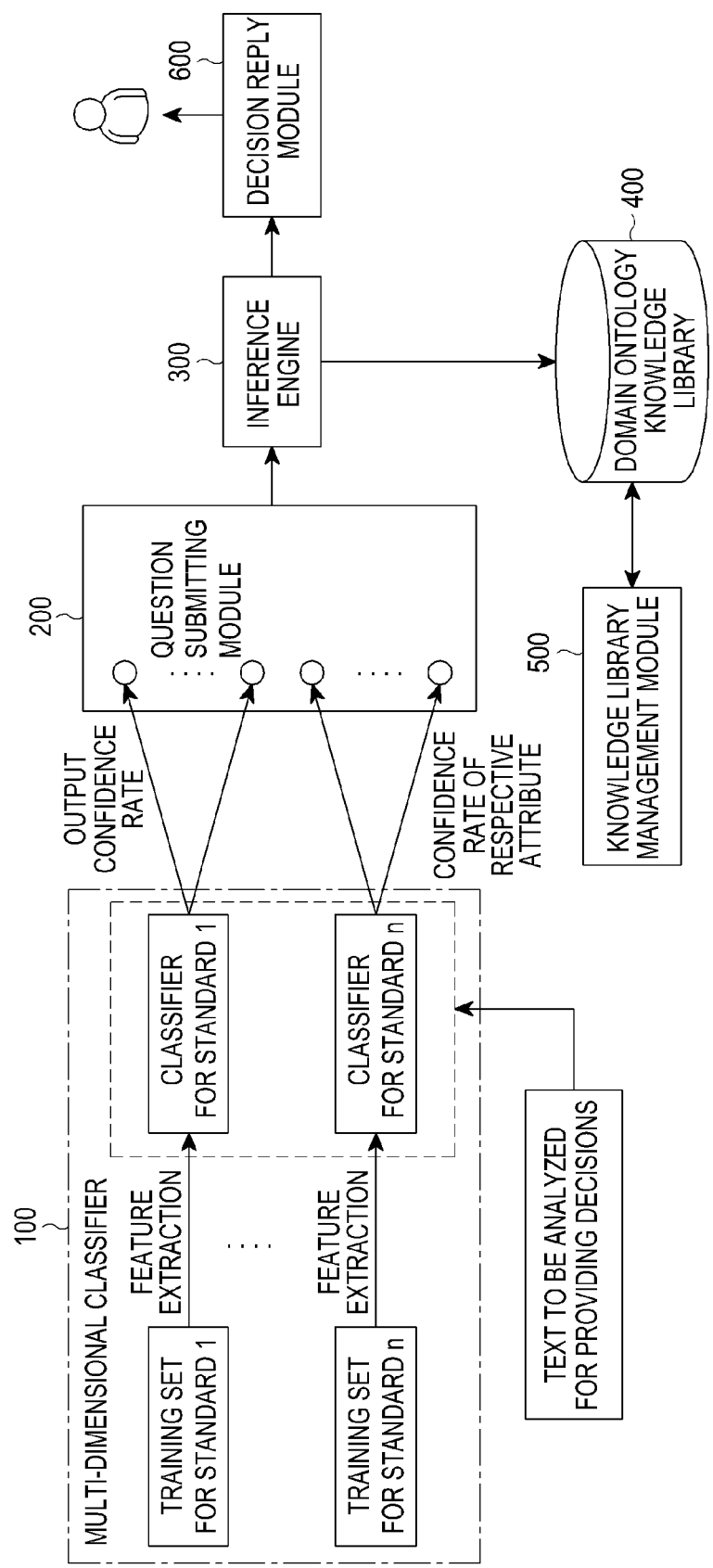
FIG. 1 is a diagram illustrating a configuration of an intelligent decision supporting system according to an exemplary embodiment of the present invention.

FIG. 1 is a diagram illustrating a configuration of an intelligent decision supporting system according to an exemplary embodiment of the present invention.

Referring to FIG. 1, the intelligent decision supporting system includes a multi-dimensional classifier 100, a question submitting module 200, an inference engine 300, a domain ontology knowledge library 400, a knowledge library management module 500 and a decision replying module 600.

The multi-dimensional classifier 100 may include a plurality of standard classifiers. The multi-dimensional classifier includes n standard classifiers, i.e. a first standard classifier to an nth standard classifier. Herein, the term "standard" refers to a set of semantic standards including multiple attributes. In an exemplary implementation, contents covered by each semantic standard do not overlap with each other, but are complementary with those of other semantic standards in an aspect of semantic aspect. In other words, a semantic standard refers to a standard for comprehension of the same text in different views. The standard may be considered as an abstract concept of a class and examples of the abstract concept, which represent a standard for comprehending a text from a certain point of view by human beings. Each semantic attribute of each set of semantic standards may be a semantic tag for describing the text. By using the multi-dimensional classifier 100, attribute description of the text to be analyzed for providing decisions may be obtained in different semantic domains. The classification standard of the multi-dimensional classifier 100 may be different depending on the application domain, and the object and manner to which the intelligent decision supporting system is applied. Examples of multi-dimensional standards will be described in more detail below.

After the semantic standard of the multi-dimensional classifier 100 is defined, a large quantity of text is needed to be collected for training each standard classifier. The multi-dimensional classifier may be trained in the following way. First, features of sample text to be trained are extracted to obtain an eigenvector space of the text. This may be implemented by a variety of methods for feature extraction. For example, a general Term Frequency-Inverse Document Frequency (TF-IDF) method may be used, or a more complicated method based on WordNet or other algorithm may be used. Methods for feature extraction intend to generate an eigenspace for describing the text in each semantic standard. Each sample text is described by eigenvectors based on an eigenspace. Eigenvectors of all texts in each semantic standard of the multi-dimensional classifier 100 are trained to obtain a training model of each standard classifier. The training model of each standard classifier may be used to predict a respective confidence rate (i.e., confidence degree) of attributes in a semantic standard. The confidence rate is generally expressed by a probability value between 0 to 1.

After the training model of a standard classifier is obtained, when a text to be analyzed is input into the multi-dimensional classifier 100, the text is classified in multiple standards by each standard classifier of the multi-dimensional classifier 100, using the training model thereof, such that a description of multiple semantic attributes of the text is obtained, as well as a value of confidence degree for each semantic attribute. Herein, the multi-dimensional classifier 100 outputs the classified multiple semantic attributes and the value of confidence degree of each semantic attribute to the question submitting module 200.

The question submitting module 200 pre-processes the multiple semantic attributes based on the received confidence rates of the multiple semantic attributes, and forms a question required by the knowledge library management module 500. The form of question is different depending on the applied domain. An example of forming the question will be described in more detail below. After the question is obtained, the question submitting module 200 initiates the inference machine 300, and submits the formed question to the inference machine 300. Here, the question may be submitted in various forms. For example, the question may be submitted as eXtensible Mark Language (XML).

The inference machine 300 analyzes the attribute of the question and inquires of the knowledge library stored in the domain ontology knowledge library module 400 according to the attribute of the question, after receiving the question from the question submitting module 200. The knowledge library records rules for deriving an answer for a question according to the attribute of the question. These rules may be specified or defined by experts in the art. According to an exemplary embodiment of present invention, the semantic standard (i.e., the attribute of the question) used by the multi-dimensional classifier 100 has a corresponding relationship with the deriving rules of the domain ontology knowledge library. That is, each semantic standard has its corresponding description in the domain ontology knowledge library. However, the semantic scope defined by the domain ontology knowledge library is much larger than the semantic standard defined by the multi-dimensional classifier. For example, the rules of the domain ontology knowledge library may correspond to a combination of at least one attribute. This will be described in more detail with reference to FIGS. 2 and 3.

The domain ontology knowledge library module 400 returns a result of the inquiry to the inference machine 300. The inference machine 300 forms an intelligent decision in a form defined by the knowledge library management module 500, based on the inquired result, and transfers the decision to the decision reply module 600. Here, the knowledge library management module 500 is used to configure the knowledge library stored in the domain ontology knowledge library module 400 and the form in which the question is submitted by the question submitting module 200. That is, the form of the question generated by the question submitting module 200 may be varied by the knowledge library management module 500, or the rules for deriving answers in the knowledge library can be updated by the knowledge library management module 500. The functions of the knowledge library management module 500 may be integrated into functions of the question submitting module 200 and the domain ontology knowledge library module 400, or be omitted.

The decision reply module 600 converts the decision into a form that may be recognized by the user, and finally outputs an answer of the decision to a user. Here, the form of outputting the decision may be different depending on the applied domain. This will be described in more detail with reference to FIGS. 2 and 3.

It will be understood that the functions of the modules may be integrated into a single module, or divided into more sub-modules.

Figure 2:
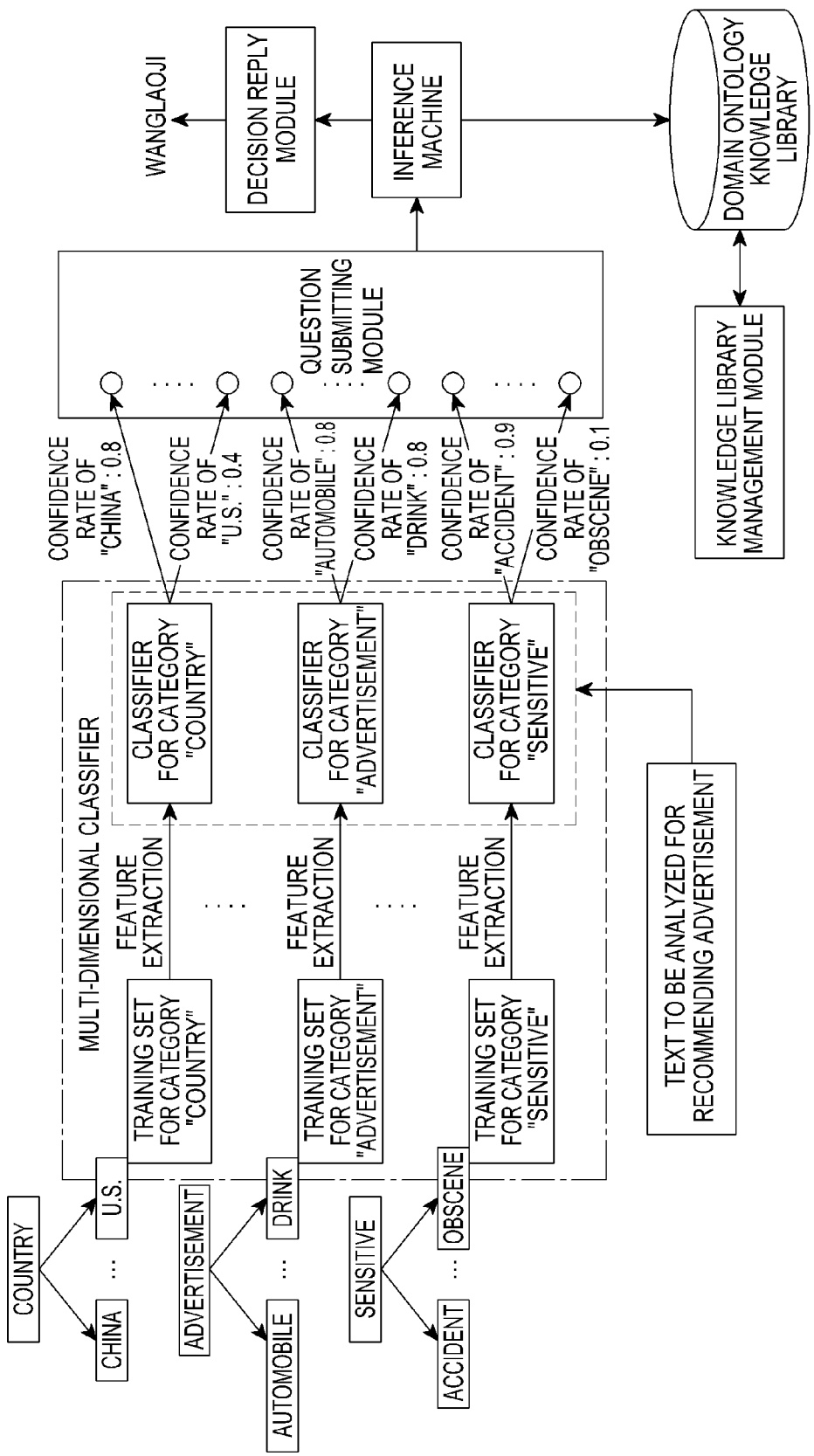
FIG. 2 illustrates an advertisement recommending system including an intelligent decision supporting system according to an exemplary embodiment of present invention.

FIG. 2 illustrates an automatic advertisement recommending system including an intelligent decision supporting system according to an exemplary embodiment of the present invention.

Referring to FIG. 2, the automatic advertisement recommending system also comprises a multi-dimensional classifier, a question submitting module, an inference machine, an ontology knowledge library of advertise domain, a knowledge library management module, and a decision reply module.

More particularly, in this automatic advertisement recommending system, the multiple dimensional standards of the multi-dimensional classifier are defined as three categories: country, advertisement and sensitive. That is, the multi-dimensional classifier comprises 3 standard classifiers. Each standard comprises a plurality of attributes. For example, the standard "country" includes attributes such as China, U.S., Japan, Germany, etc. The standard "advertisement" includes categories of various products, such as automobile, drink, house appliance, etc. The standard "sensitive" includes sensitivity categories of the advertisement, such as accident, obscene, etc. The categories of attributes shown here are only illustrative and they are not intended to limit the present invention. In the advertisement recommending system according to an exemplary embodiment of present invention, the multi-dimensional classifier based on SVM is different from conventional keyword classification technique in that the attribute of a classifier of each dimension further covers extended attributes related to the attribute. Generally, a simple keyword classification technique recognizes an attribute represented by a keyword only when the keyword is present in the text. The multi-dimensional classifier of an exemplary embodiment of the present invention does not depend solely on the attribute of keyword when recognizing attribute of the text. Using the attribute "China" of the classifier of geography domain as an example, not only a displayed geographic word "Beijing" is considered as an attribute, but also words and phrases having semantics of Chinese elements are considered as extended attributes, such as dumplings, Forbidden City, golden week, red tourism, etc. In the case that words related to the keyword, such as dumpling, Forbidden City, exist in the text, the category of attribute "country" of the text is recognized as "China". That is, when a keyword of the extended attribute which is associated with an attribute category exists in the text, the multi-dimensional classifier of the present invention is able to recognize the attribute of the text.

A large quantity of text samples are collected for each standard classifier, and eigenvectors of the text samples are extracted. Here, the multi-dimensional classifier removes words that do not carry semantic information, and restores each word into its prototype. For example, if a word is a past tense verb, this verb is restored into prototype. Then, frequencies of a word and a document are calculated by using a TF-IDF method to obtain their weights. All of the words are used as an eigenspace of a classifier to obtain eigenvectors of each text. A category model may be obtained by training of the eigenvectors. After obtaining the category model, a prediction may be performed on a text of unknown category to obtain a confidence rate of each attribute of the text. As shown in FIG. 2, in the output of the classifier of category "geography", the confidence rate of "China" is 0.8, and the confidence rate of "U.S." is 0.4; in the output of the classifier of category "advertisement", the confidence rate of "automobile" is 0.8, and the confidence rate of "drink" is 0.8; and in the output of the classifier of category "sensitive", the confidence rate of "accident" is 0.9, and the confidence rate of "obscene" is 0.1. The confidence rates of all the attributes are used as input of the question submitting module, and the question submitting module forms a question. If the threshold of the confidence rate is set to 0.8, attributes that have confidence rates equal to or higher than 0.8 are selected to form the question to be submitted. In this advertisement recommending system, the confidence rates of "automobile" and "drink" are relatively higher. In addition, considering that the confidence rate of "accident" is also high, "automobile" is excluded from being an attribute for forming a question. That is, the question submitting module generates a question based on attributes "China" and "drink", and submits the generated question to the inference machine.

The inference machine makes an inquiry of the ontology knowledge library of the advertisement domain according to the question, obtains an inference result, and transfers the inference result to the decision reply module to make a conversion for the user. Finally, the user sees the decision of the system, i.e. which advertisement is recommended. As shown in FIG. 2, based on advertisements associated with attributes "China" and "drink" which are defined in the ontology knowledge library of the advertisement domain, the final decision gives an advertisement related to Chinese drink, such as "Wanglaoji". On the contrary, since the attribute "U.S." is excluded due to a low confidence rate, the advertisement recommending system will not recommend an advertisement related to an American drink. Herein, the decision reply module provides the user with a decision reply in the form of an advertisement (for example, providing a link and a picture of the advertisement on webpage).

In addition, according to an exemplary embodiment of present invention, the advertisement recommending system may further recommend a plurality of appropriate advertisements according to the output of the multi-dimensional classifier. The output of the inference machine can be set to provide a predetermined number of advertisements required by the user or designer. For example, the number of recommended advertisement may be set to more than 1.

Figure 3:
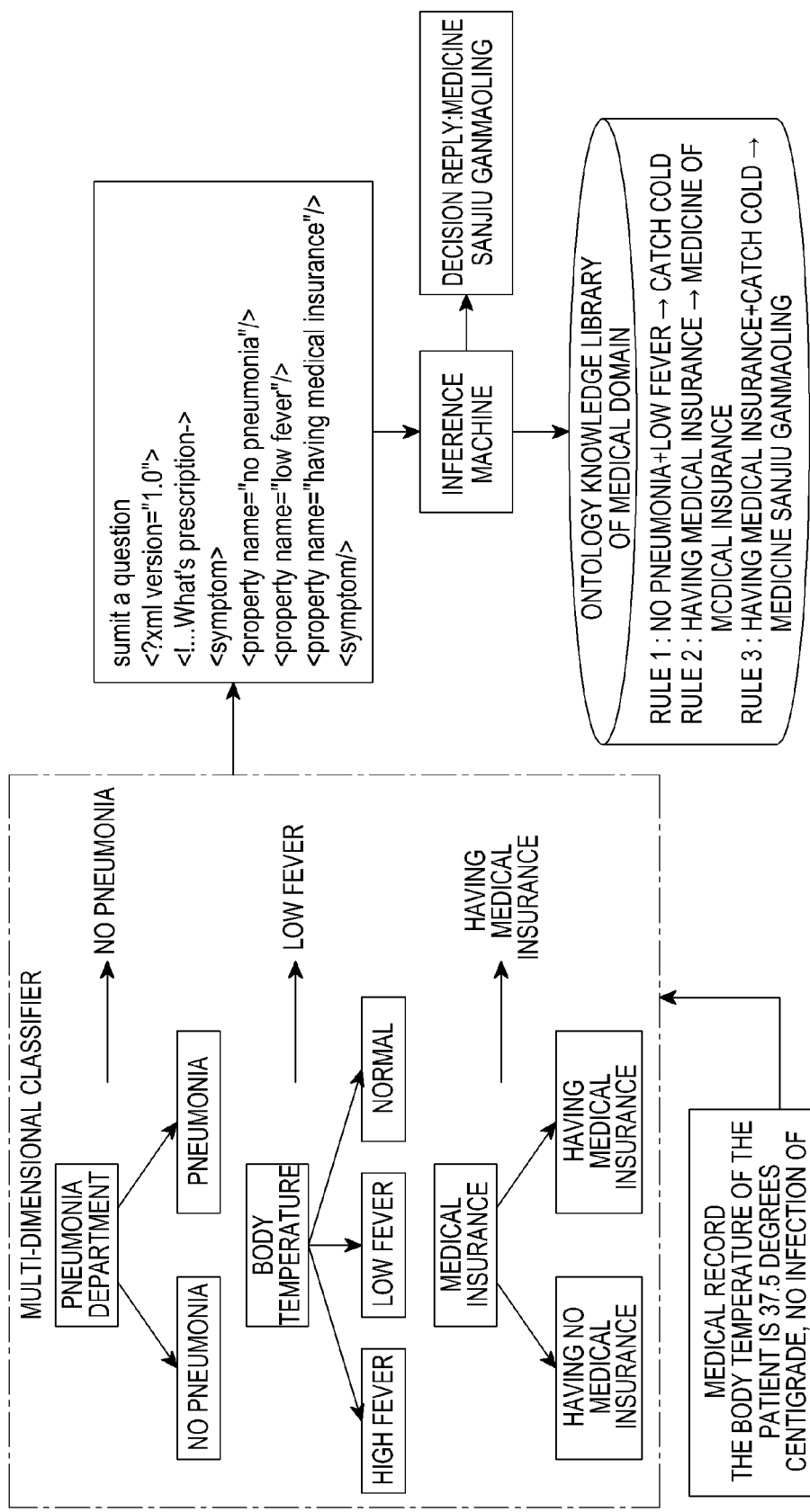
FIG. 3 is a diagram illustrating a method for applying an intelligent decision supporting system according to an exemplary embodiment of present invention.

FIG. 3 is a diagram illustrating a method for applying an intelligent decision supporting system according to an exemplary embodiment of the present invention.

Referring to FIG. 3, an example is provided of an intelligent decision supporting system regarding a medical diagnosis. That is, the intelligent diagnosis supporting system is used to automatically provide a diagnosis scheme or provide a prescription based on a diagnosis record of a doctor. In the illustrated exemplary embodiment, the intelligent diagnosis supporting system comprises a multi-dimensional classifier, a question submitting module, an inference machine, an ontology knowledge library of medical domain, a knowledge library management module and a decision reply module. The multi-dimensional classifier is composed of medical records of doctors in different medical departments. For example, a first dimensional classifier is a medical record of a medical insurance department, the second dimensional classifier is a medical record of a body temperature department, and the third dimensional classifier is medical record of a pneumonia department, or the like. Of course, medical experts may define the standard dimension of the multi-dimensional classifier. The multi-dimensional classifier is trained on the basis of a large amount of medical records, such that the classifier of each dimension represents a comprehensive assessment of disease of a patient in one point of view. By doing this, a training model of the classifier of each dimension is obtained. Then, a medical record to be analyzed is analyzed by using the training model of each dimension of the multi-dimensional classifier. In FIG. 3, the medical record to be analyzed may be a text which describes the symptoms of a patient. For example, the medical record may describe that "the temperature of patient is 37.5 degrees centigrade, no infection in lung, the number of medical insurance is xxxx . . . . etc." The multi-dimensional classifier analyzes the text and predicts the following attributes: "no pneumonia", "low fever" and "having medical insurance". That is, the three attributes having the highest confidence rates are "no pneumonia", "low fever" and "having medical insurance", which are obtained by the training model of the multi-dimensional classifier. Then, a question to be submitted to the inference machine is generated based on the above three attributes. FIG. 3 illustrates a question in XML form. The inference machine searches for an answer for this question in an ontology knowledge library of a medical domain. There are three rules recorded in the ontology knowledge library. Rule 1: "catch cold" is derived from (no pneumonia+low fever). Rule 2: "all medicine prescribed by medical insurance" is derived from (having medical insurance). Rule 3: "medicine Sanjiu Ganmaoling" is derived from (having medical insurance+catch cold). Finally, the inference machine obtains an answer for the question. That is, the final decision (an intelligent prescription) is "medicine Sanjiu Ganmaoling".

It will be understood that an exemplary intelligent decision supporting system of present invention provides an intelligent system for helping a user make a decision by combining a knowledge library of domain ontology with a multi-dimensional text classifier. An exemplary intelligent decision supporting system of present invention differs from the conventional text classifier in that, the present invention does not simply classify the text or provide a tag for the text according to a keyword or other standard. Instead, exemplary embodiments of the present invention provide a decision which complies with the mode of the human mind according to the applied knowledge domain. This improves the efficiency of processing text and decision making based on the processed text, and provides convenience that the prior text processing method cannot provide.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An intelligent decision supporting system, the system comprising:
   at least one controller configured to execute one or more modules; and
   a storage unit for storing the one or more modules,
   wherein the one or more modules comprises:
      a multi-dimensional classifier module, comprising a plurality of classifiers that define different semantic standards and are trained based on the different semantic standards, for classifying a text by the semantic standards and for outputting a plurality of attributes of the text and a confidence rate of each of the plurality of attributes;
      a question submitting module for receiving the output of the multi-dimensional classifier module, for forming a question based on the plurality of attributes of the text and the confidence rate of each attribute, and for submitting the question to an inference module;

the inference module for receiving the question submitted by the question submitting module, for inquiring of a domain ontology knowledge library based on the question, and for providing an answer for the question to a decision reply module;

a domain ontology knowledge library module for storing a domain ontology knowledge library related to an application domain of the intelligent decision supporting system, wherein the domain ontology knowledge library records descriptions of rules for deriving decisions corresponding to the semantic standards of the multi-dimensional classifier module; and the decision reply module for providing the answer for the question provided by the inference machine to a user.

2. The system of claim 1, wherein the one or more modules further comprises:

a knowledge library management module for configuring the rules for deriving the domain ontology knowledge library stored in the domain ontology knowledge library module and the form of the question of the question submitting module.

3. The system of claim 1, wherein the multi-dimensional classifier module comprises a Supporting Vector Machine (SVM).

4. The system of claim 1, wherein the rules for deriving decisions in the domain ontology knowledge library correspond to combinations of semantic standards of the multi-dimensional classifier module.

5. The system of claim 1, wherein the multi-dimensional classifier module collects training texts according to semantic standards, extracts eigenvectors of the training texts to form an eigenvector space, describes each training text with eigenvectors based on the eigenvector space, and predicts and outputs attributes of the text to be predicted and confidence rate of each attribute based on the training model of each classifier.

6. The system of claim 5, wherein the multi-dimensional classifier module uses a Term Frequency-Inverse Document Frequency (TF-IDF) method to extract eigenvectors of the training texts.

7. The system of claim 1, wherein the confidence rate comprises a probability value between 0 and 1.

8. The system of claim 1, wherein the question is submitted to the inference module as eXtensible Markup Language (XML).

9. A method for making an intelligent decision, the method comprising:

defining semantic standards of a plurality of classifiers of a multi-dimensional classifier according to an application domain and recording descriptions of rules in a domain ontology knowledge library for deriving decisions that correspond to the semantic standards of the multi-dimensional classifier;

collecting training texts according to the semantic standards, and training the multi-dimensional classifier;

classifying a text to be analyzed by using multiple standards, and outputting attributes of the text and confidence rate of each attribute;

forming a question for intelligent decision based on attributes of the text and the confidence rate of each attribute; and inquiring of the domain ontology knowledge library based on the question by an inference machine to obtain an answer for intelligent decision and providing the answer to a user.

10. The method of claim 9, wherein the collecting of the training texts according to the semantic standards comprises:

collecting training texts according to semantic standards, by the multi-dimensional classifier;

extracting eigenvectors of the training texts to form an eigenvector space;

describing each training text with eigenvectors based on the eigenvector space, to form a training model for each classifier; and predicting and outputting attributes of the text and confidence rate of each attribute based on the training model of each classifier.

11. The method of claim 10, further comprising using a Term Frequency-Inverse Document Frequency (TF-IDF) method to extract eigenvectors of a training text.

12. The method of claim 9, wherein the rules for deriving decisions in the domain ontology knowledge library correspond to combinations of semantic standards of the multi-dimensional classifier.

13. The method of claim 9, wherein the confidence rate comprises a probability value between 0 and 1.

14. The method of claim 9, wherein the question is submitted to the inference machine as eXtensible Markup Language (XML).

* * * * *